US012034348B2

(12) United States Patent
Boisseau et al.

(10) Patent No.: US 12,034,348 B2
(45) Date of Patent: Jul. 9, 2024

(54) ELECTROMAGNETIC DEVICE WITH TWO CONDUCTIVE COILS, FIRST AND SECOND YOKES, STABILIZING MAGNETS AND ACTUATING MAGNETS

(71) Applicant: COMMISSARIAT A L'ENERGIE ATOMIQUE ET AUX ENERGIES ALTERNATIVES, Paris (FR)

(72) Inventors: Sébastien Boisseau, Grenoble (FR); Baptiste Alessandri, Grenoble (FR); Matthieu Boucaud, Grenoble (FR); Gérard Delette, Grenoble (FR); Olivier Tosoni, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 408 days.

(21) Appl. No.: 17/439,261

(22) PCT Filed: Feb. 4, 2020

(86) PCT No.: PCT/FR2020/050177
§ 371 (c)(1),
(2) Date: May 23, 2022

(87) PCT Pub. No.: WO2020/188159
PCT Pub. Date: Sep. 24, 2020

(65) Prior Publication Data
US 2022/0294324 A1    Sep. 15, 2022

(30) Foreign Application Priority Data
Mar. 15, 2019  (FR) ...................... 19 02692

(51) Int. Cl.
H02K 35/02    (2006.01)
H02K 7/18     (2006.01)
H02K 35/06    (2006.01)

(52) U.S. Cl.
CPC .......... *H02K 35/02* (2013.01); *H02K 7/1853* (2013.01); *H02K 35/06* (2013.01)

(58) Field of Classification Search
CPC ........ H02K 33/00; H02K 35/02; H02K 35/00; H02K 35/04; H02K 3/26; H02K 15/02;
(Continued)

(56) References Cited

U.S. PATENT DOCUMENTS 3,928,988 A * 12/1975 Luth .................. H01F 7/14
66/138
4,020,433 A *  4/1977 Uchidoi ............. H01F 7/064
335/230
(Continued)

FOREIGN PATENT DOCUMENTS

FR    2 928 501 A1    9/2009
FR    2 953 660 A1    6/2011
(Continued)

OTHER PUBLICATIONS

U.S. Appl. No. 16/650,540, filed Mar. 25, 2020, US 2020/0280251 A1, Ghislain Despesse et al.
(Continued)

*Primary Examiner* — Maged M Almawri
(74) *Attorney, Agent, or Firm* — Oblon, McClelland, Maier & Neustadt, L.L.P.

(57) ABSTRACT

An electromagnetic device includes a conductive coil, a main magnet pivoting about an axis XX', a first and second yoke, a first and second stabilizer magnet, as well as a first and second actuator magnet arranged to slide along the axis YY' that is perpendicular to the pivot axis XX', in such a way
(Continued)

as to force the main magnet to adopt an equilibrium position, the stabilizer magnets are arranged such that this sliding is accompanied by a movement of the stabilizer magnets so as to position one of the stabilizer magnets in a given position in order to limit the leaks which could occur at one of the two yokes.

16 Claims, 5 Drawing Sheets

(58) Field of Classification Search
CPC ........ H02K 33/02; H02K 33/04; H02K 33/06; H02K 33/12; H02N 2/188; H01F 7/06
USPC ............. 310/15–38, 12.12, 12.15, 12.01, 12, 310/12.26, 12.16, 12.25; 335/222, 230, 335/234; 381/396, 400; 417/417
See application file for complete search history.

(56) References Cited

U.S. PATENT DOCUMENTS

| | | | | | |
|---|---|---|---|---|---|
| 4,260,914 | A | * | 4/1981 | Hertrich | G01P 3/52 310/15 |
| 4,315,197 | A | * | 2/1982 | Studer | H02K 35/06 335/229 |
| 4,367,449 | A | * | 1/1983 | Veisz | H01F 7/08 335/229 |
| 4,500,827 | A | * | 2/1985 | Merritt | H02K 35/02 322/3 |
| 4,727,344 | A | * | 2/1988 | Koga | H01H 51/2209 335/229 |
| 4,881,054 | A | * | 11/1989 | Polgar | H01H 51/2236 335/230 |
| 5,180,939 | A | * | 1/1993 | Rosswurm | F02G 1/0435 290/1 R |
| 5,394,131 | A | * | 2/1995 | Lungu | H01H 51/2209 335/265 |
| 5,587,615 | A | * | 12/1996 | Murray | H02K 33/16 310/15 |
| 5,833,211 | A | * | 11/1998 | Berling | F04B 53/1082 251/129.09 |
| 6,262,500 | B1 | * | 7/2001 | Wakiwaka | H02K 33/16 310/15 |
| 6,598,621 | B1 | * | 7/2003 | Wygnanski | F16K 31/082 137/66 |
| 6,614,137 | B2 | * | 9/2003 | Joong | H02K 41/031 318/135 |
| 7,498,681 | B1 | * | 3/2009 | Kellogg | H02K 35/02 290/1 R |
| 7,569,952 | B1 | * | 8/2009 | Bono | H02K 35/02 310/15 |
| 7,710,227 | B2 | * | 5/2010 | Schmidt | H02K 35/02 310/171 |
| 7,808,236 | B1 | * | 10/2010 | Huang | H10N 30/00 324/249 |
| 7,948,124 | B1 | * | 5/2011 | Waters | H02K 35/00 310/36 |
| 8,432,049 | B2 | * | 4/2013 | Jung | F03D 5/00 336/200 |
| 8,593,018 | B2 | * | 11/2013 | Furuich | H02K 33/16 310/17 |
| 8,629,569 | B2 | * | 1/2014 | Roberts | H02K 35/06 290/1 R |
| 9,121,875 | B2 | * | 9/2015 | Fukada | G01R 29/12 |
| 9,240,267 | B2 | * | 1/2016 | Nagahara | H02K 35/02 |
| 9,509,304 | B2 | * | 11/2016 | Ruff | G08C 17/00 |
| 9,929,597 | B2 | * | 3/2018 | Jaskolski | H01F 38/14 |
| 10,122,250 | B2 | * | 11/2018 | Antonelli | H02K 35/00 |
| 10,404,150 | B2 | * | 9/2019 | Swanson | H02K 35/06 |
| 11,114,926 | B2 | * | 9/2021 | Delette | H02K 35/02 |
| 11,716,005 | B2 | * | 8/2023 | Tosoni | H02K 35/02 310/12.01 |
| 11,732,769 | B2 | * | 8/2023 | Clymer | H02K 49/106 188/267 |
| 11,742,852 | B2 | * | 8/2023 | Liu | H03K 17/00 361/628 |
| 11,916,462 | B2 | * | 2/2024 | Haronian | H02K 1/34 |
| 2005/0029874 | A1 | * | 2/2005 | Dadd | H02K 33/12 310/12.12 |
| 2006/0001323 | A1 | * | 1/2006 | Gang | B62J 6/06 310/156.01 |
| 2006/0138875 | A1 | * | 6/2006 | Kim | F04D 33/00 310/15 |
| 2008/0048506 | A1 | * | 2/2008 | Deak | H02K 35/02 310/12.25 |
| 2008/0278008 | A1 | * | 11/2008 | Roberts | H02K 35/06 310/29 |
| 2010/0323644 | A1 | * | 12/2010 | Bataille | H02K 35/06 455/127.1 |
| 2011/0198945 | A1 | * | 8/2011 | Nakagawa | H02K 33/16 310/12.25 |
| 2011/0198949 | A1 | * | 8/2011 | Furuich | H02K 33/16 310/25 |
| 2012/0104765 | A1 | * | 5/2012 | Esteve | H02K 35/02 310/38 |
| 2012/0104875 | A1 | * | 5/2012 | Park | H02K 33/16 310/25 |
| 2012/0119596 | A1 | * | 5/2012 | Doll | H02K 16/02 310/36 |
| 2012/0175974 | A1 | * | 7/2012 | Robertson | H01F 7/1646 310/12.26 |
| 2012/0311871 | A1 | * | 12/2012 | Heckman | B26B 19/282 310/15 |
| 2014/0285296 | A1 | | 9/2014 | Nagahara et al. | |
| 2016/0197533 | A1 | * | 7/2016 | Dolman | H02K 35/02 290/1 R |
| 2016/0314923 | A1 | * | 10/2016 | Tsuneyoshi | H02K 7/1876 |
| 2016/0365759 | A1 | * | 12/2016 | Lin | H02K 53/00 |
| 2017/0141668 | A1 | * | 5/2017 | Xing | H02K 1/34 |
| 2018/0131371 | A1 | * | 5/2018 | Liu | H03K 17/94 |
| 2018/0198336 | A1 | * | 7/2018 | Abella | H02K 53/00 |
| 2018/0301969 | A1 | * | 10/2018 | Takahashi | H04M 19/04 |
| 2019/0013723 | A1 | * | 1/2019 | Hsu | H02K 35/06 |
| 2019/0036386 | A1 | * | 1/2019 | Vandenberg | H02K 21/00 |
| 2019/0229601 | A1 | * | 7/2019 | Liao | H02K 7/003 |
| 2019/0348896 | A1 | * | 11/2019 | Delette | H02K 35/02 |
| 2020/0044526 | A1 | * | 2/2020 | Tang | H02K 33/18 |
| 2020/0076288 | A1 | * | 3/2020 | Nerubenko | F16F 7/1005 |
| 2021/0257896 | A1 | * | 8/2021 | Haronian | H02K 35/02 |
| 2022/0320986 | A1 | * | 10/2022 | Bayaliev | H02K 35/06 |
| 2022/0360157 | A1 | * | 11/2022 | Haronian | H02K 35/02 |
| 2023/0112671 | A1 | * | 4/2023 | Shim | H02K 33/16 310/28 |
| 2023/0170778 | A1 | * | 6/2023 | Haronian | H02N 11/002 310/15 |

FOREIGN PATENT DOCUMENTS

| | | |
|---|---|---|
| FR | 3 068 539 A1 | 1/2019 |
| WO | WO 2019/002775 A1 | 1/2019 |

OTHER PUBLICATIONS

U.S. Appl. No. 16/062,693, filed Jun. 15, 2018, US 2018/0374620 A1, Gerard Delette et al.
U.S. Appl. No. 16/628,817, filed Jan. 6, 2020, US 2020/0227994 A1, Olivier Tosoni et al.
International Search Report issued on Mar. 30, 2020 in PCT/FR2020/050177 filed on Feb. 4, 2020, 2 pages.
French Preliminary Search Report issued on Dec. 11, 2019 in French Patent Application No. 19 02692 filed on Mar. 15, 2019 (with translation of category of cited documents), 2 pages.

* cited by examiner

ELECTROMAGNETIC DEVICE WITH TWO CONDUCTIVE COILS, FIRST AND SECOND YOKES, STABILIZING MAGNETS AND ACTUATING MAGNETS

TECHNICAL FIELD

The present invention relates to an electromagnetic energy converter and/or electromagnetic microgenerator. In particular, the present invention relates to an electromagnetic converter intended to be implemented in a self-contained switch.

BACKGROUND OF THE INVENTION

Figure 1:
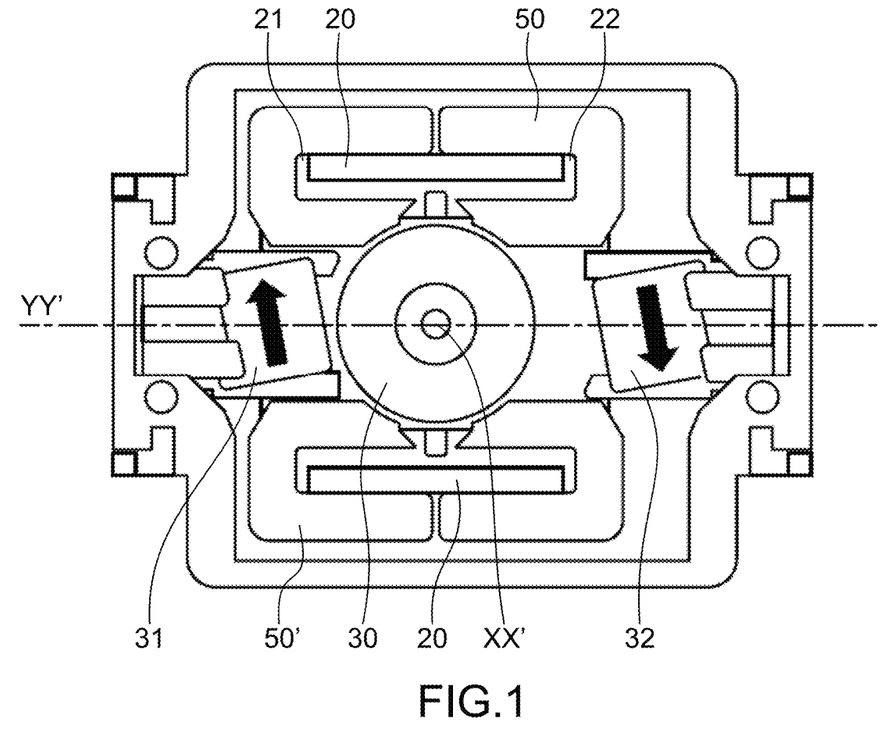
FIG. 1 is a schematic representation along a cutting plane comprising the alignment axis YY' and perpendicular to the pivot axis XX', of an electromagnetic device of a known device of the prior art described in document [1] cited at the end of the description.

FIG. 1 presents a known electromagnetic device of the prior art described in document [1] cited at the end of the description.

This electromagnetic device 10 comprises in particular:
 a conductive coil 20 extending between a first 21 and a second 22 end along an alignment axis YY',
 a main magnet 30 in a space V defined by the conductive coil,
 two ferromagnetic yokes 50 and 50' intended to guide the magnetic flux generated by the main magnet 30 and disposed on either side of a plane P1 formed by the alignment axis YY' and a pivot axis XX' perpendicular to the alignment axis YY'.

The two ferromagnetic yokes each comprise ends that form a housing inside which the main magnet can pivot about the pivot axis XX' between two stable equilibrium positions referred to respectively as the first equilibrium position and the second equilibrium position.

The general principle of operation of the device is based on the activation of a variation over time in the magnetic flux passing through the conductive coil so as to make an electrical voltage appear at the terminals of the latter.

The device comprises, in this regard, two actuating magnets 31 and 32 arranged to slide in each of the directions defined by the alignment axis YY' so as to force the main magnet 30 to adopt one or other of the equilibrium positions.

In particular, the magnetic polarisation of the two actuating magnets are in a plane perpendicular to the pivot axis XX', and in opposition to each other.

Such a known device of the prior art is relatively compact and also makes it possible to generate an appreciable electrical voltage at the terminals of the conductive coil 20.

However, such a device, when it is disposed in proximity to a ferromagnetic element, in particular on a support made from a ferromagnetic material, has its functioning disturbed.

In particular, magnetic leaks from, one or other of the yokes to the ferromagnetic element are liable to occur, and consequently affect the overall performance of the electromagnetic device.

Moreover, the presence of air gaps at the yokes, for example to facilitate the mounting of the conductive coil, exacerbates this phenomenon.

These leaks are, moreover, particularly appreciable whenever the device is in proximity to, in particular at a distance of less than 5 mm from, the support made from a ferromagnetic material. In such circumstances, it has been found that the magnetic opposition between one or other of the actuating magnets and the main magnet is not sufficient to cause the pivoting of said main magnet. In other words, positioning the electromagnetic device in proximity to a support made from a ferromagnetic material makes said device inoperative.

One aim of the present invention is therefore to propose an electromagnetic device also functioning in proximity to a support made from a ferromagnetic material.

BRIEF SUMMARY OF THE INVENTION

The aim stated above is achieved by an electromagnetic device comprising:
 one or two conductive coils;
 a main magnet able to pivot about a pivot axis XX' between two equilibrium positions,
 a first and a second yoke arranged to guide the magnetic flux generated by the main magnet,
 a first and a second pair of magnets, comprising, respectively, a first and a second stabilising magnet, as well as a first and a second actuating magnet arranged to slide along each of the directions defined by an alignment axis YY' of said actuating magnets and of the main magnet, perpendicular to the pivot axis XX', so as to force the main magnet to adopt one or other of the equilibrium positions, the stabilising magnets being arranged so that this sliding is accompanied by a movement of the stabilising magnets so as to position the stabilising magnet, paired with the actuating magnet forcing the main magnet into one of its equilibrium positions, in a given position enabling said stabilising magnet to oppose the magnetic leaks liable to occur at one of the two yokes.

According to one embodiment, the first and the second yoke each comprise, respectively, a first and a second air gap, and, when it is in the given position, the stabilising magnet in question is opposite one of the air gaps, the polarity of the stabilising magnets being oriented to oppose the magnetic leaks liable to occur at the air gap opposite which it is located.

According to one embodiment, as soon as a stabilising magnet is put opposite one of the air gaps, the other stabilising magnet makes a movement of retracting from the other air gap, and more particularly from the yoke comprising this other air gap.

According to one embodiment, the first and the second air gap are disposed respectively on either side of a plane P1 formed by the pivot axis XX' and the alignment axis YY'.

According to one embodiment, the first pair of magnets and the first air gap on the one hand and the second pair of magnets and the second air gap on the other hand are disposed respectively on either side of a plane P2 perpendicular to the alignment axis YY', and passing through the pivot axis XX'.

According to one embodiment, the first stabilising magnet and the second stabilising magnet are arranged so that, whether the first actuating magnet forces the main magnet into one of the two equilibrium positions, the first stabilising magnet is opposite the first air gap, while, when the second actuating magnet forces the main magnet into the other of the two equilibrium positions, the second stabilising magnet is opposite the second air gap.

According to one embodiment, the first and the second actuating magnet each have a polarity in a plane perpendicular to the planes P1 and P2, and antiparallel to each other.

According to one embodiment, an axis, referred to as the first axis, carrying the polarity of the first actuating magnet, and another axis, referred to as the second axis, carrying the polarity of the second actuating magnet, each form a non-zero angle alpha with the alignment axis YY'.

According to one embodiment, the first air gap and the intersection of the first axis with the plane P2 on the one hand, and the second air gap and the intersection of the second axis with the plane P2 are disposed respectively on either side of the plane P1.

According to one embodiment, the second air gap and the intersection of the first axis with the plane P2 on the one hand, and the first air gap and the intersection of the second axis with the plane P2 are disposed respectively on either side of the plane P1.

According to one embodiment, the first and the second actuating magnet, as well as the first and the second stabilising magnet, are arranged so as to slide simultaneously and integrally, advantageously the first and the second actuating magnet and the first and the second stabilising magnet are held in fixed connection by a sliding rail.

According to one embodiment, the device comprises a first and a second face, respectively, on either side of a plane P3 perpendicular to the planes P1 and P2, the first and the second stabilising magnet being arranged so as to be placed opposite, respectively, the first and the second air gap by the second face.

According to one embodiment, the polarity of the stabilising magnets is perpendicular to the plane P3.

According to one embodiment, the first yoke and the second yoke are symmetrical with each other with respect to the pivot axis XX'.

According to one embodiment, the device is either an electromagnetic-energy converter or an electromagnetic microgenerator.

The invention also relates to a switch comprising an electromagnetic device according to the present invention.

BRIEF DESCRIPTION OF THE DRAWINGS

Other features and advantages will emerge in the following description of the electromagnetic device according to the invention, given by way of non-limitative examples, with reference to the accompanying drawings, wherein.

DETAILED DESCRIPTION OF PARTICULAR EMBODIMENTS

The invention described in detail below uses an electromagnetic-energy converter and/or electromagnetic microgenerator (hereinafter "electromagnetic device") comprising a conductive coil accommodating a main magnet in its internal space V. In particular, the main magnet is able to pivot, under the action of actuating magnets, in order to cause a variation over time in magnetic flux in the conductive coil, and thus make an electrical voltage appear at the terminals of said coil.

Moreover, the electromagnetic device comprises two ferromagnetic yokes arranged to guide the magnetic flux generated by the main magnet and, optionally, each provided with an air gap at which magnetic leaks are liable to arise. The device therefore uses stabilising magnets arranged to limit, or even prevent, the magnetic leaks liable to occur at one or other of the yokes as soon as the main magnet pivots from one equilibrium position to the other equilibrium position. More particularly, when air gaps are present, the stabilising magnets are arranged to be positioned opposite respectively one or other of the air gaps as soon as the magnet pivots from one equilibrium position to the other equilibrium position.

The invention that is described in detail below uses yokes provided with an air gap. In particular, as described, the electromagnetic device according to the present invention uses stabilising magnets arranged to limit the magnetic leaks liable to arise at said air gaps.

However, the invention, which is not limited solely to this aspect, can be extended to a device the yokes of which do not have an air gap.

FIGS. 2A to 3B show examples of implementation of an electromagnetic device 10 according to the present invention.

Figure 3A:
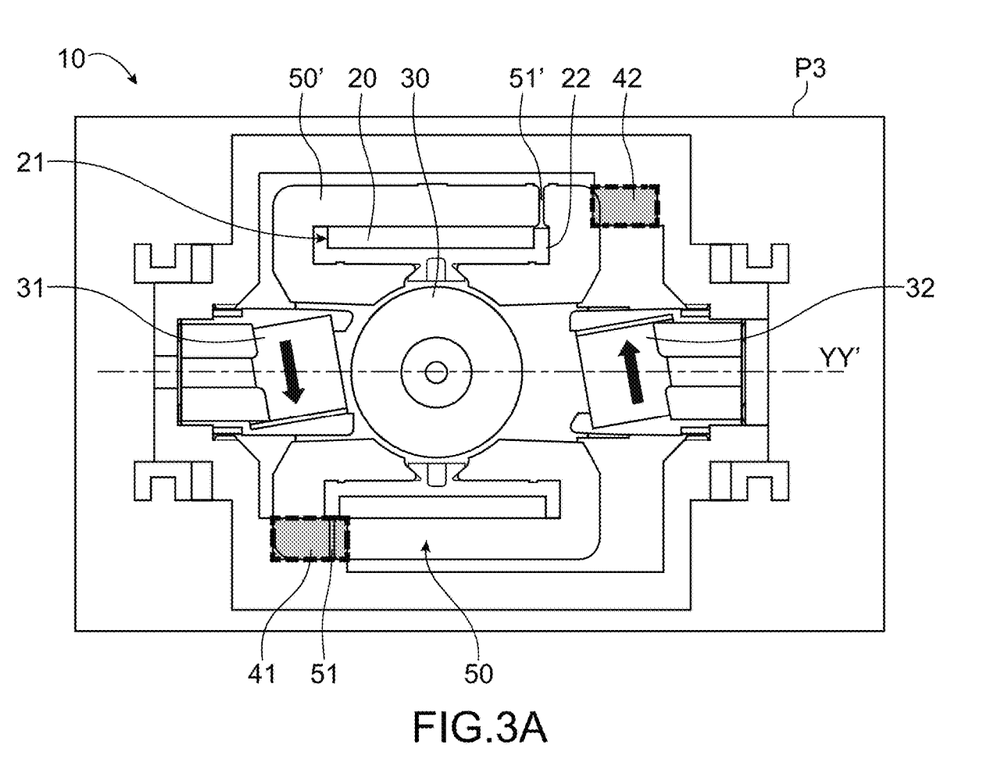
FIG. 3A is a view of the first face of the electromagnetic device according to the present invention, the main magnet being forced into its first equilibrium position.
Figure 3B:
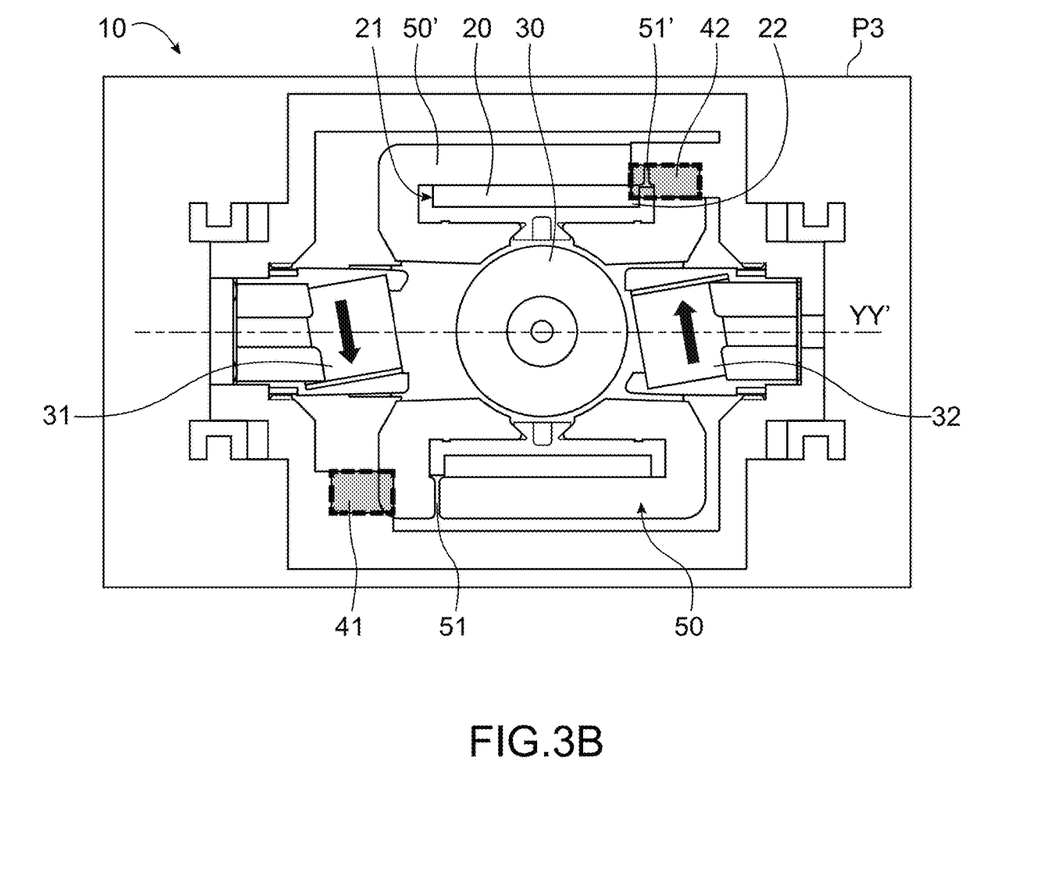
FIG. 3B is a view of the first face of the electromagnetic device according to the present invention, the main magnet being forced into its second equilibrium position.

In these examples, the electromagnetic device 10 is provided with a conductive coil 20 that extends along an axis, referred to as the alignment axis YY', between two ends 21 and 22 (FIGS. 3A and 3B).

The alignment axis YY' may be an axis of symmetry of the conductive coil 20.

The conductive coil 20 is made from a winding of a conductive wire, for example a copper wire, along the alignment axis YY'. The conductive coil 20 moreover comprises an internal space V open at the two ends of said coil. It is obvious, without its being necessary to state it, that the copper wire comprises two ends that are, throughout the remainder of the present description, referred to as terminals of the conductive coil 20.

The electromagnetic device 10 also comprises a main magnet 30. The magnet may for example be disposed in the internal space V of the conductive coil 20.

A person skilled in the art will also be able to consider an electromagnetic device provided with two conductive coils wound respectively around a first yoke and a second yoke both described below. The remainder of the statement is however limited to the description of an electromagnetic device provided with a single conductive coil.

The electromagnetic device 10 also comprises two ferromagnetic yokes referred to respectively as first yoke 50 and second yoke 50' (FIGS. 2A, 2B, 3A and 3B), The first yoke 50 and the second yoke 50' each comprise two ends that form a housing inside which the main magnet 30 is maintained in pivot connection so as to be able to pivot about a pivot axis XX' perpendicular to the alignment axis YY' (FIGS. 2A and 2B), Each of the two yokes thus closes onto the main magnet 30. In other words, the two ends of a yoke are spaced so as to provide a housing inside which the main magnet is located, and so that each of the two yokes forms with the magnet a closed magnetic loop.

Particularly advantageously the housing has a shape complementary to the main magnet 30.

The ferromagnetic yokes can be disposed around the main magnet with a clearance with a width perfectly determined so as to form layers of air disposed facing each other. The width of the layer of air located between the external surface of the main magnet 30 and one or other of the ends of the ferromagnetic yoke determines the intensity of the magnetic flux circulating in said yoke. The quantity that makes it possible to determine the influence of the air gap on the magnetic flux is known by the term reluctance. A precise reluctance value corresponds to a given width of layer of air.

The main magnet 30 may have a cylindrical external surface.

It is moreover understood, without its being necessary to state it, that the housing formed by the ends of the ferromagnetic yokes is disposed in the internal space V of the conductive coil 20. In particular, as shown in FIGS. 3A and 3B, the conductive wire forming the conductive coil 20 surrounds a first section of each ferromagnetic yoke.

Figure 2A:
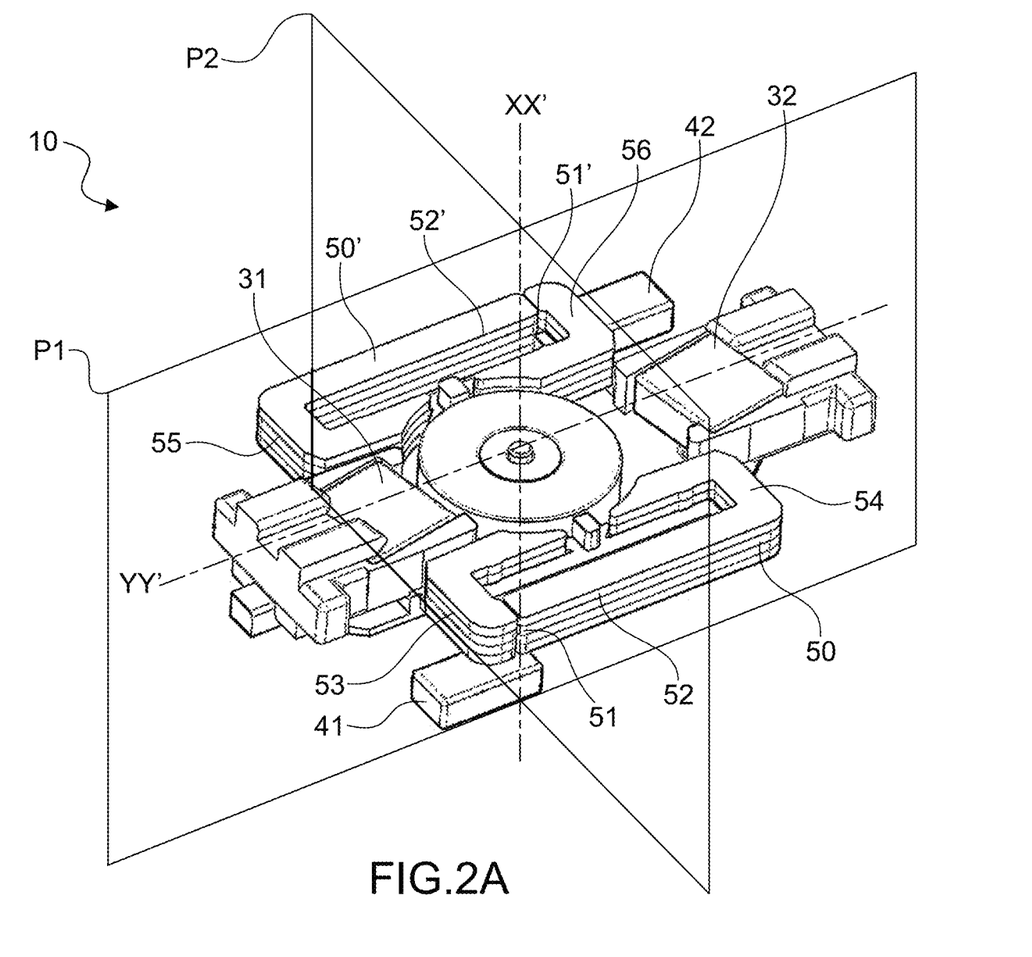
FIG. 2A is a representation in perspective of a first face of the electromagnetic device according to the present invention.
Figure 2B:
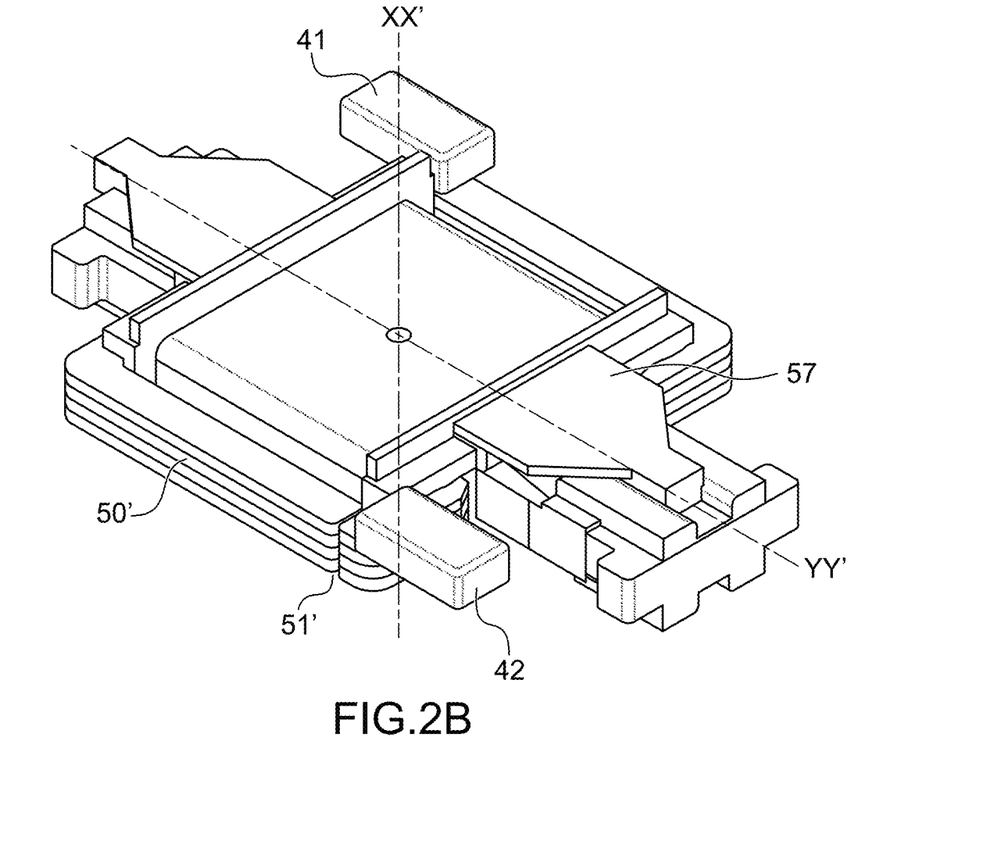
FIG. 2B is a representation in perspective of a second face of the electromagnetic device according to the present invention.

The first yoke 50 and the second yoke 50' may be disposed on either side of a plane P1 comprising the alignment axis YY' and the pivot axis XX' (FIGS. 2A and 2B).

The first and the second yoke may each comprise an external section referred to respectively as first external section 52 and second external section 52'. The external sections may have a form that is generally elongate in a direction parallel to the alignment axis YY' and be extended at each of their ends by arms 53, 54, 55, 56 (FIG. 2A) closing onto the main magnet 30.

In order to facilitate the assembly of the coil 20 with the first 50 and second 50' yoke, the latter two are generally demountable.

Consequently, the first 50 and the second 50' yokes may each comprise an air gap referred to respectively as first 51 and second 51' air gap (FIGS. 2A, 2B, 3A and 3B).

The first and the second air gap may be disposed respectively on the first and second external section.

Each of the two ferromagnetic yokes may comprise at least one ferromagnetic material selected from: alloys based on iron and with high induction at saturation (for example an induction at saturation greater than 1.5 tesla) such as pure iron, iron alloyed with Si(FeSi), iron alloyed with. Ni(FeNi), or iron alloyed with Co(FeCo). These alloys may also comprise addition elements such as Cr, P, Cu or Al.

The ferromagnetic material may also comprise ferrites with a spinel structure (such as MnZn or NiZn). The latter, because of its low electrical conductivity, is advantageous since it makes it possible to reduce the losses by eddy current. However, its induction at saturation remains low.

Finally, the ferromagnetic material may also comprise an alloy based on Fe of the metallic glass type produced in amorphous or nanocrystalline form.

Each yoke forms with the main magnet 30 a dosed magnetic circuit. In other words, each of the ferromagnetic yokes makes it possible to guide the magnetic flux on a dosed circuit, and thus limit the magnetic leaks.

The electromagnetic device furthermore comprises two pairs of magnets referred to respectively as first pair and second pair.

More particularly, the pairs of magnets and the air gaps are arranged so that the first pair and the first air gap on the one hand and the second pair and the second air gap on the other hand are disposed respectively on either side of a plane P2 perpendicular to the alignment axis YY' and passing through the pivot axis XX' (FIG. 2A).

The first pair of magnets comprises a first actuating magnet 31 and a first stabilising magnet 41.

In an equivalent manner, the second pair of magnets comprises a second actuating magnet 32 and a second stabilising magnet 42.

The main magnet 30, the first actuating magnet 31 and the second actuating magnet 32 are aligned on the alignment axis YY'.

The first 31 and the second 32 actuating magnet are arranged to slide simultaneously and integrally along one or other of the directions defined by the alignment axis YY'. "Integral sliding" means a sliding of the same amplitude and in the same direction.

Moreover, the actuating magnets 31, 32 each have a magnetic polarity antiparallel with each other, and lying in a plane P3 comprising the alignment axis YY' and perpendicular to the pivot axis XX'. More particularly, the magnetic polarity of the first actuating magnet 31 is carried by an axis, referred to as the first axis, different from the alignment axis YY'. In other words, the magnetic polarity of the first actuating magnet 31 forms a non-zero angle alpha (modulo $\pi$) with the alignment axis YY'.

In an equivalent manner, the magnetic polarity of the second actuating magnet 32 is carried by an axis, referred to as the second axis, parallel to the first axis.

According to a first configuration, the first air gap and the intersection of the first axis with the plane P2 on the one hand and the second air gap and the intersection of the second axis with the plane P2 are disposed respectively on either side of the plane P1.

According to a second configuration, the second air gap and the intersection of the first axis with the plane P2 on the one hand and the first air gap and the intersection of the second axis with the plane P2 are disposed respectively on either side of the plane P1.

The simultaneous and integral sliding of the actuating magnets 31 and 32 in one or other of the directions defined by the alignment axis YY' makes it possible to force the main magnet 30 to adopt, by pivoting about the pivot axis XX', one or other of two equilibrium positions referred to respectively as first position and second position.

"Equilibrium position" means a stable equilibrium position, and in particular a magnetically stable position.

Since the main magnet 30 can adopt two different equilibrium positions under the action of the actuating magnets, it is understood, without its being necessary to specify it, that the magnetic polarity of the main magnet 30 is not parallel to the pivot axis XX'. In this regard, and advantageously, the magnet polarity of the main magnet lies in the plane P3.

The rotation of the main magnet from its first position to its second position is referred to as the "outward cycle" while the opposite rotation is referred to as the "return cycle".

The adoption of one or other of the equilibrium positions by the main magnet 30 is governed by the amplitude of interaction between said main magnet 30 and the actuating magnets 31, 32.

By way of illustration, the main magnet 30 may, at an initial instant, be in the second position. In other words, the second actuating magnet 32 is located closer to the main magnet 30 than the first actuating magnet 31 (FIG. 3b).

A force of mechanical origin for example exerted on the first actuating magnet 31 then makes it possible to engage the sliding of the first actuating magnet 31 and of the second actuating magnet 32, so that the first actuating magnet 31 approaches the main magnet 30 and the second actuating magnet 32 moves away therefrom.

Therefore, when the two actuating magnets slide, the magnetic interaction between the second actuating magnet 32 and the main magnet 30 decreases, while the magnetic interaction between the first actuating magnet 31 and the main magnet 30 increases, thus increasing the magnetic instability of the main magnet 30.

An abrupt rotation of the main magnet 30 about the pivot axis XX' is then observed since the magnetic instability caused by the sliding of the two actuating magnets is no longer tenable.

The first actuating magnet 31 and the second actuating magnet 32 may be identical.

"Identical" means with the same form and the same magnetic polarity.

The first stabilising magnet 41 and the second stabilising magnet 42 are arranged so that the sliding of the first 31 and of the second 32 actuating magnet is accompanied by a movement of the stabilising magnets 41 and 42.

In particular, during this movement, the stabilising magnet paired with the actuating magnet forcing the main magnet 30 into an equilibrium position comes to be located opposite one of the air gaps, while the other stabilising magnet is retracted from the other air gap.

Moreover, the magnetic polarity of each stabilising magnet 41 and 42 is oriented so as to oppose the magnetic leaks occurring at the air gap opposite which it is located.

The orientation of the magnetic polarity of each stabilising magnet is then determined by the orientation of the magnetic polarity of the actuating magnet with which it forms a pair of magnets.

In particular, if an actuating magnet 31 or 32 forces the main magnet 30 into an equilibrium position by a given pole (for example its north pole), the stabilising magnet with which it forms a pair puts a pole of the same nature opposite the air gap. Thus a stabilising magnet that is opposite an air gap of one of the two yokes makes it possible to limit the magnetic leaks liable to occur at said air gap.

Each of the stabilising magnets may be put opposite respectively each of the air gaps by a second face of the electromagnetic device opposite to a first face of said device, said faces being disposed on either side of the plane P3. According to this configuration, the polarity of the stabilising magnets is advantageously perpendicular to the plane P3.

The movement of the stabilising magnets 41 and 42 during the sliding of the actuating magnets 31 and 32 may also be a sliding.

More particularly, the sliding of the stabilising magnets may be implemented in each of the directions defined by the alignment axis YY'.

In this regard, the stabilising magnets and the actuating magnets are connected together by a fixed connection. In particular, the stabilising magnets and the actuating magnets may be attached to a sliding rail or to a movable carriage 57 (FIG. 2b).

Thus, when the main magnet 30 is forced into its first position by the first actuating magnet 31, the first stabilising magnet 41 is opposite the first air gap 51 while the second stabilising magnet 42 is retracted from the second air gap 51'. A thrust force exerted for example on the second actuating magnet 32 in order to implement an outward cycle then makes the first pair and the second pair of magnets slide.

During this sliding, the second actuating magnet 32 approaches the main magnet 30 and the first actuating magnet 31 moves away therefrom. Simultaneously with this sliding, the second stabilising magnet 42 is positioned opposite the second air gap 51', while the first stabilising magnet 41 is retracted from the first air gap 51.

"Retracting" means a stabilising magnet at a distance from the air gap, and in particular from the yoke. In particular, a stabilising magnet is retracted from a yoke as soon as the projection of said yoke and the projection of said stabilising magnet, on the plane P3, are in zero overlap.

The positioning of the second stabilising magnet 42 opposite the second air gap 52' makes it possible to limit the circulation of a magnetic flux in the second yoke 50', and consequently to limit the magnetic leaks liable to occur at this air gap 52' provided that the device is positioned on a support made from a ferromagnetic material.

Thus, when the first pair and the second pair slide, the magnetic interaction between the second actuating magnet 32 and the main magnet 30 increases, while the magnetic interaction between the first actuating magnet 31 and the main magnet 30 decreases, thus increasing the magnetic instability of the main magnet 30.

An abrupt rotation of the main magnet 30 about the pivot axis XX' is then observed since the magnetic instability caused by the sliding of the first pair and of the second pair is no longer tenable.

In the absence of stabilising magnets as proposed in the present invention, the magnetic instability that is the source of the turning of the main magnet 30 would not be observed if the electromagnetic device were disposed in proximity to or on a support made from a ferromagnetic material.

By way of illustration, the electromagnetic device illustrated in FIG. 2A is able to deliver an energy of 600 µJ provided that it is at a distance from a support made from a ferromagnetic material.

The same device, positioned on a support made from a ferromagnetic material, delivers an energy of 400 µJ, In the absence of a stabilising magnet, the device in proximity to a support made from a ferromagnetic material does not deliver any energy since the abrupt turning of the main magnet 30 cannot be initiated.

The electromagnetic device is then advantageously implemented to make an electromagnetic-energy converter or an electromagnetic microgenerator.

Such a device can then be attached, for example by magnetisation, on a support made from a ferromagnetic material, while keeping its functionality of converting mechanical energy into electromagnetic energy.

The electromagnetic device is advantageously implemented to make a self-contained wireless and/or battery-free switch intended to control home-automation functions such as lighting or the opening and closing of roller blinds.

REFERENCES

[1] FR 17 56233.

The invention claimed is:

1. An electromagnetic device comprising:
one or two conductive coils;
a main magnet able to pivot about a pivot axis XX' between two equilibrium positions,
a first and a second yoke arranged to guide the magnetic flux generated by the main magnet,
a first and a second pair of magnets, comprising, respectively, a first and a second stabilising magnet, as well as a first and a second actuating magnet arranged to slide along each of the directions defined by an alignment axis YY' of said actuating magnets and of the main magnet, perpendicular to the pivot axis XX', so as to force the main magnet to adopt one or other of the equilibrium positions, the stabilising magnets being arranged so that this sliding is accompanied by a movement of the stabilising magnets so as to position the stabilising magnet, paired with the actuating magnet forcing the main magnet into one of the equilibrium positions of the main magnet, in a given position enabling said stabilising magnet to oppose the magnetic leaks liable to occur at one of the two yokes.

2. The device according to claim 1, wherein the first yoke and the second yoke are symmetrical with each other with respect to the pivot axis XX'.

3. The device according to claim 1, wherein the device is either an electromagnetic-energy converter or an electromagnetic microgenerator.

4. A switch comprising the device according to claim 1.

5. The device according to claim 1, wherein the first and the second yoke each comprise, respectively, a first and a second air gap, and, when the main magnet is in the given position, the stabilising magnet in question is opposite one of the air gaps, the polarity of the stabilising magnets being oriented to oppose the magnetic leaks liable to occur at the air gap opposite which it is located.

6. The device according to claim 5, wherein the first and the second actuating magnet, as well as the first and the second stabilising magnet, are arranged so as to slide simultaneously and integrally, advantageously the first and the second actuating magnet and the first and the second stabilising magnet are held in fixed connection by a sliding rail.

7. The device according claim 5, wherein the device comprises a first and a second face, respectively, on either side of a plane P3 perpendicular to the planes P1 and P2, the first and the second stabilising magnet being arranged so as to be placed opposite, respectively, the first and the second air gap by the second face.

8. The device according to claim 7, wherein the polarity of the stabilising magnets is perpendicular to the plane P3.

9. The device according to claim 5, wherein, as soon as a stabilising magnet is put opposite one of the air gaps, the other stabilising magnet makes a movement of retracting from the other air gap.

10. The device according to claim 5, wherein the first and the second air gap are disposed respectively on either side of a plane P1 formed by the pivot axis XX' and the alignment axis YY'.

11. The device according to claim 10, wherein the first pair of magnets and the first air gap on the one band and the second pair of magnets and the second air gap on the other hand are disposed respectively on either side of a plane P2 perpendicular to the alignment axis YY', and passing through the pivot axis XX'.

12. The device according to claim 11, wherein the first stabilising magnet and the second stabilising magnet are arranged so that, whether the first actuating magnet forces the main magnet into one of the two equilibrium positions, the first stabilising magnet is opposite the first air gap, while, when the second actuating magnet forces the main magnet into the other of the two equilibrium positions, the second stabilising magnet is opposite the second air gap.

13. The device according to claim 11, wherein the first and the second actuating magnet each have a polarity in a plane perpendicular to the planes P1 and P2, and antiparallel to each other.

14. The device according to claim 13, wherein an axis, referred to as the first axis, carrying the polarity of the first actuating magnet, and another axis, referred to as the second axis, carrying the polarity of the second actuating magnet, each form a non-zero angle alpha with the alignment axis YY'.

15. The device according to claim 14, wherein the first air gap and the intersection of the first axis with the plane P2 on the one hand, and the second air gap and the intersection of the second axis with the plane P2 are disposed respectively on either side of the plane P1.

16. The device according to claim 14, wherein the second air gap and the intersection of the first axis with the plane P2 on the one hand, and the first air gap and the intersection of the second axis with the plane P2 are disposed respectively on either side of the plane P1.

* * * * *